United States Patent [19]

Leavy

[11] Patent Number: 4,652,238

[45] Date of Patent: Mar. 24, 1987

[54] ENHANCED LIMITED FIELD OF VIEW SIMULATOR

[75] Inventor: Wayne P. Leavy, Doylestown, Ohio

[73] Assignee: Goodyear Aerospace Corporation, Akron, Ohio

[21] Appl. No.: 722,951

[22] Filed: Apr. 12, 1985

[51] Int. Cl.⁴ ............................................... G09B 9/08
[52] U.S. Cl. ..................................... 434/44; 352/132; 340/972; 434/40
[58] Field of Search .................... 352/89, 132, 133; 340/705, 972, 980; 358/103, 104; 434/38, 43, 44, 20, 21

[56] References Cited

U.S. PATENT DOCUMENTS 3,787,619  1/1974  Wolff ..................................... 434/43
4,131,345  12/1978  Carollo .............................. 352/133
4,348,186  9/1982  Harvey et al. ....................... 434/44

Primary Examiner—Richard C. Pinkham
Assistant Examiner—Leo P. Picard
Attorney, Agent, or Firm—P. E. Milliken; R. J. Slattery, III

[57] ABSTRACT

A system of enhancing a limited field of view (LFOV) aircraft simulator, having less than a full 360×360 degree continuous field of view, such that while a primary object is tracking within the field of view it is fully reproduced as an aircraft, target, runway, etc. and once it migrates outside of this area, or if another primary object is located outside of this area, the object is represented and tracked as a light spot. Once the primary object migrates within the limited field of view, the light spot will be extinguished and replaced by the fully reproduced object. The relative distance of the primary object to the simulated cockpit is illustrated by varying the magnitude of the light spot.

8 Claims, 3 Drawing Figures

ENHANCED LIMITED FIELD OF VIEW SIMULATOR

BACKGROUND OF THE INVENTION

Various methods have been employed to provide visual imagery to produce the sensation of flying for pilot training simulators. Some have used video generated systems while others have used computer generated imaging (CGI) to project visual imagery onto a screen, producing a normal field of view. Limited Field of View (LFOV) systems are those in which the field of view is less than a full 360×360 degree continuous visual image. A typical LFOV system would be a fully reproduced continuous visual image of 160 degrees (horizontal)×60 degrees (vertical).

In a LFOV system, problems result when a primary object of interest, such as an enemy fighter, target, runway, etc. migrates outside of the field of view. Once outside of this field of view, the pilot no longer has visual contact with the primary object but must track it using only his instruments. The optimum solution is to produce a fully reproduced 360×360 degree continuous visual image such that the primary object or objects could be visually tracked at all times. However, the computer memory and cost involved (approximately in the order of magnitude of ten times) currently prohibits such a system. Therefore, what is required in the art is a method for visually tracking a primary object at all times without substantially increasing the overall system cost.

BRIEF SUMMARY OF THE INVENTION

This invention, which is an advancement in the art of aircraft simulators, provides for increasing the visual tracking of a primary object or target without substantially increasing the cost and/or complexity of the simulator. A primary obJect, while within the limited field of view, is fully reproduced and displayed on the screen. However, once the primary object migrates outside of this area, or if an additional primary object is located outside of this area, it is not fully reproduced but is represented by a light spot. The pilot then is visually able to continuously track a primary object. The relative distance between a primary object tracking outside the LFOV and the manned simulated cockpit is illustrated by varying the magnitude of the light spot. Once a primary object passes within the limited field of view, the light spot will be extinguished and replaced by the fully reproduced primary object.

BRIEF DESCRIPTION OF THE DRAWINGS

The following is a brief description of the drawings.

DESCRIPTION OF THE INVENTION

Figure 1:
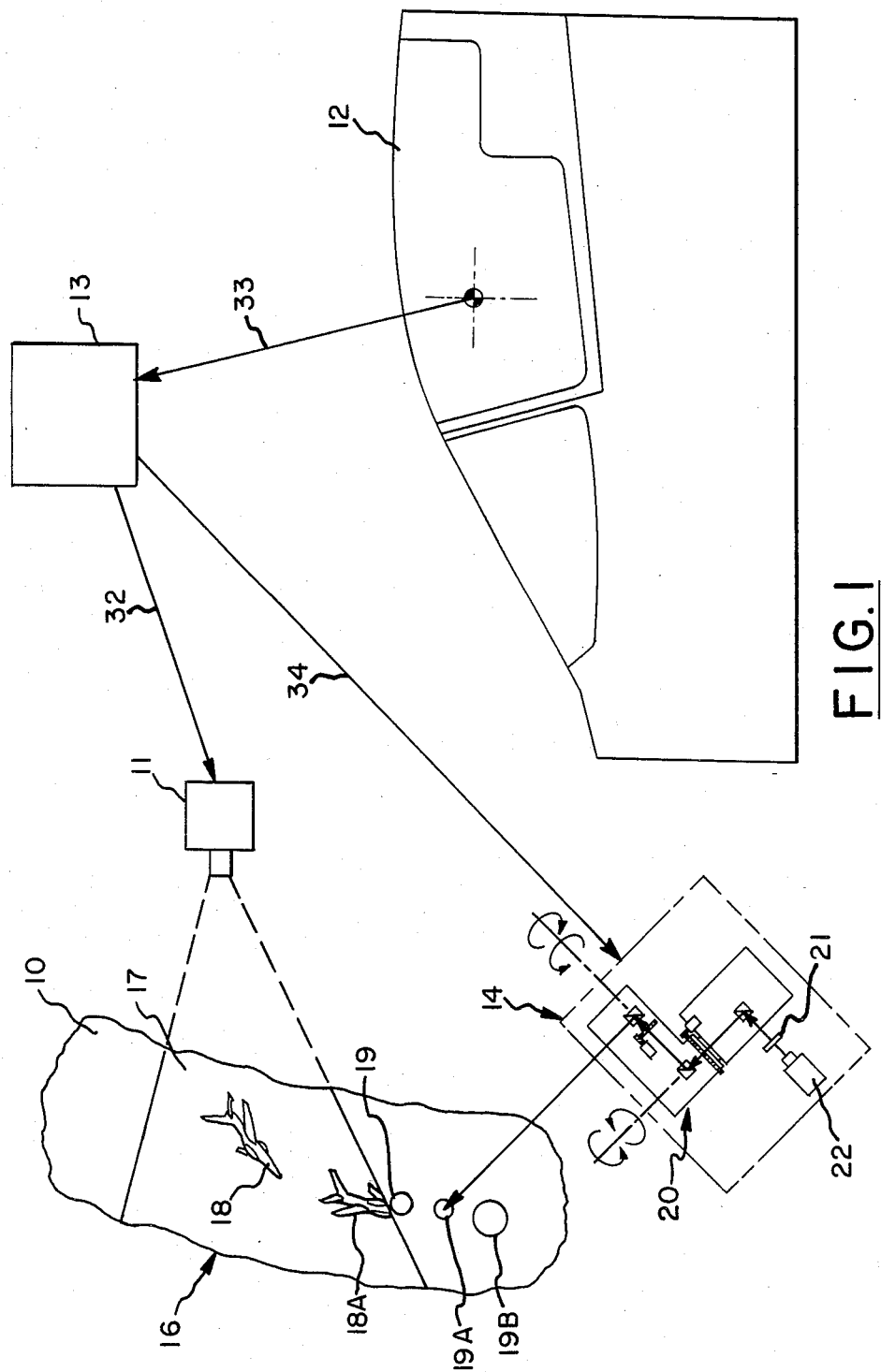
FIG. 1 is a diagrammatic representation of the preferred arrangement of the enhanced limited field of view simulator.

FIG. 1 of the drawings illustrates a diagrammatic representation of an enhanced limited field of view aircraft simulator with the improvement incorporated therein. The aircraft simulator is comprised of a screen 10, a visual projecting means 11, a manned simulated cockpit 12, a computer means 13, and an enhanced projecting means generally indicated by reference number 14.

The visual projecting means 11 receives electronic signals, indicated by line 32, from the computer means 13 and projects imagery onto the screen 10 producing a limited field of view 16. The screen 10 is usually at least partly spherical in shape with the preferred embodiment resulting in a domed structure. The limited field of view system is typically less than the screen area and may be approximately 160 degrees (horizontal) by 60 degrees (vertical). The limited field of view 16 includes background imagery 17 and at least one a primary object 18 such as a target, aircraft, runway, etc., in imagery form.

A primary obJect 18 is fully reproduced while within the limited field of view 16. As it starts to migrate outside of this limited field of view 16, it becomes only partially reproduced, as indicated by reference number 18A, and upon totally migrating outside the field 16, the primary object is represented by a light spot 19. Furthermore, if another primary object approaches the manned simulated cockpit from outside the limited field of view and the original primary object is still within the field, then the other primary object will be tracked as a light spot until it too enters the field of view. As long as a primary object is outside of the limited field of view, its position will be tracked as a light spot.

Distance information is illustrated by varying the magnitude of the light spot 19. As the relative distance between the primary object increases, the magnitude of the light spot will decrease as illustrated by reference number 19A and as the relative distance decreases, the magnitude of the light spot will increase as illustrated by reference number 19B.

The manned simulated aircraft cockpit 12 transmits electronic input signals, indicated by line 33, to the computer means 13. The computer means generates electronic output signals, indicated by line 34, which are transmitted to the enhanced projecting means 14. The enhanced projecting means responds to these signals such that it projects a light spot 19 onto the screen for tracking the primary object 18 outside of the normal field of view. The enhanced projecting means is comprised of a light spot projector, generally referred to by numeral 20, a shutter 21 and a light source 22. The enhanced projecting means is located outside of the pilot's line of sight. A typical location would be between the screen 10 and in front of the manned simulated aircraft 12.

Figure 2:
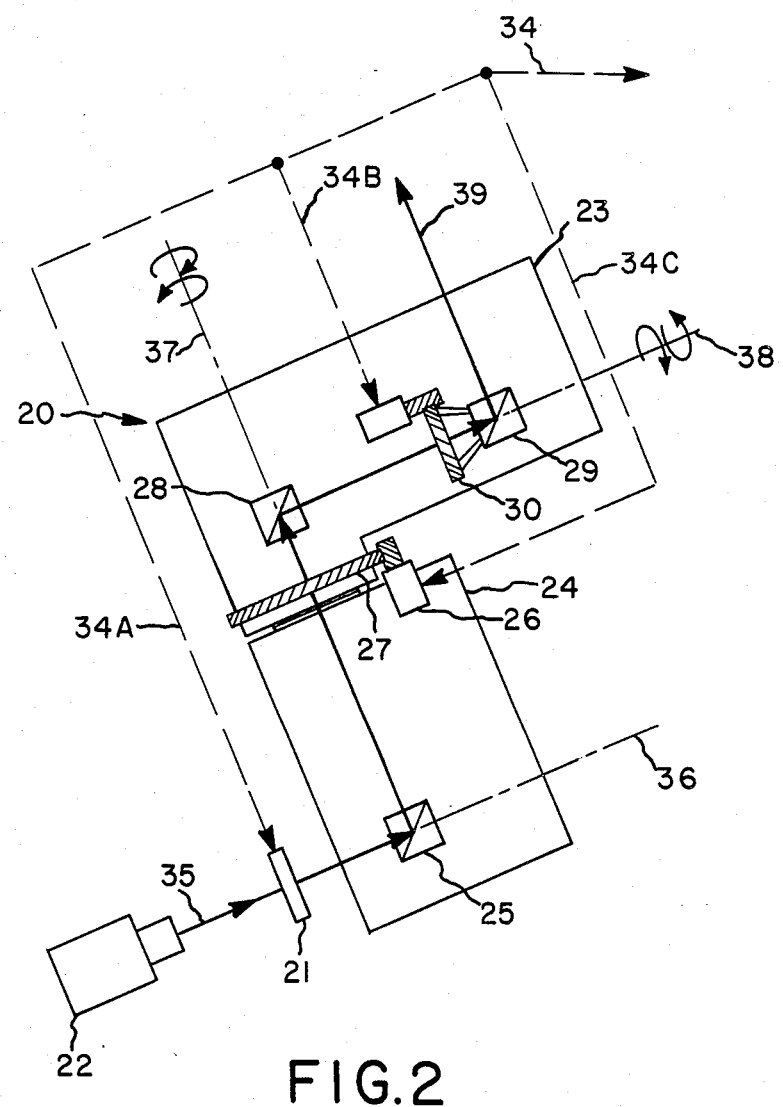
FIG. 2 is a diagrammatic representation of the preferred embodiment of the enhanced projecting means.

Now, referring to FIG. 2, the light source 22, which may be a laser light source, generates and transmits rays of light 35 to a shutter 21. The shutter 21 is positioned such that in its full closed position the transmission of light is effectively blocked, while in its full open position the rays of light are substantially transmitted through the shutter 21. Between these two positions the rays of light are proportionally transmitted. The opening and closing of the shutter 21 is controlled electronically by output signals, indicated by line 34A, from the computer means 13.

Figure 3:
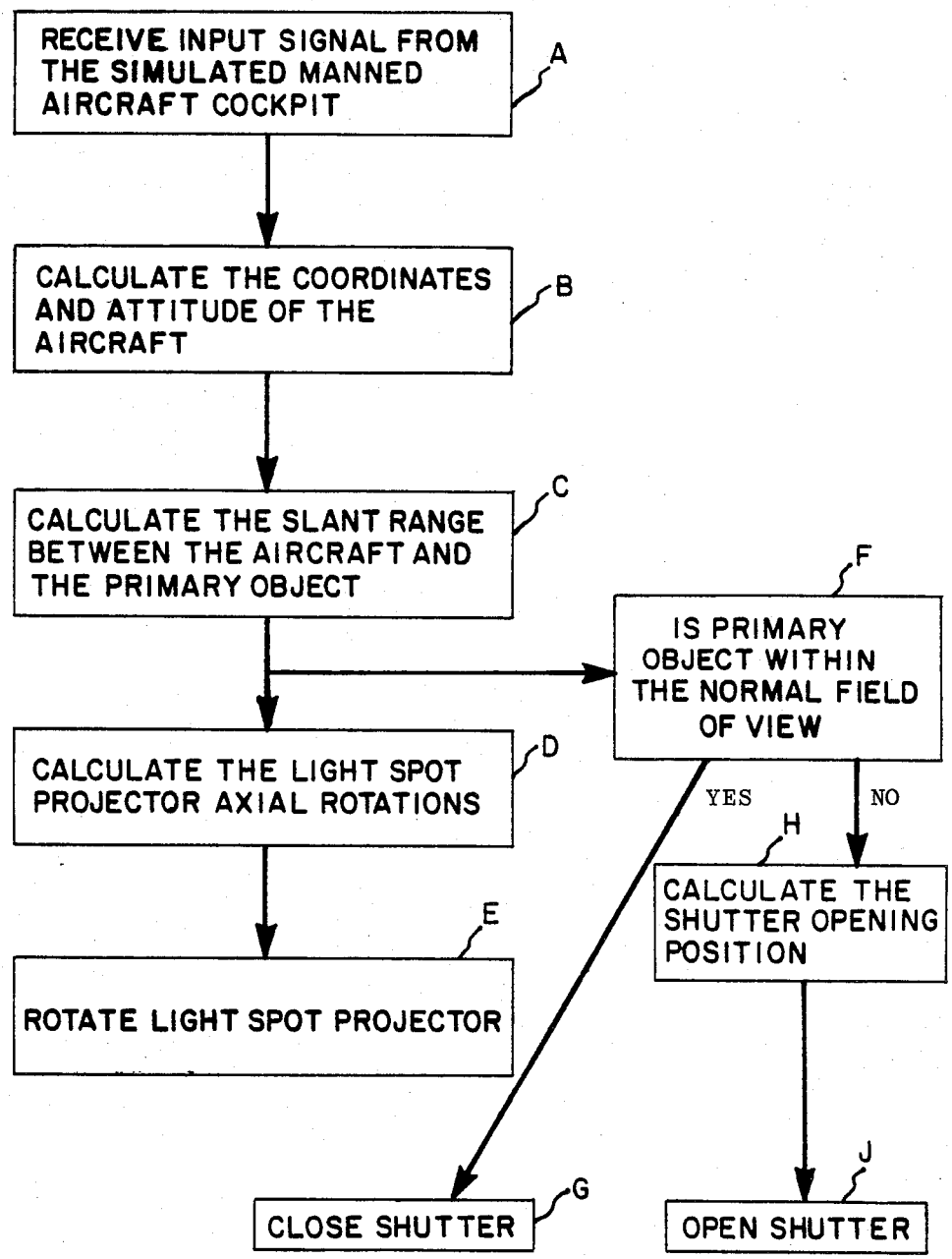
FIG. 3 is a block diagram of the computer means control logic.

The rays of light 35 transmitted through the shutter are received along the "C" axis 36 and redirected by the light spot projector along axes "A" and "B" (37, 38) and finally projected out of the light spot projector 20 as indicated by line 39. The light spot projector 20 may be, but not necessarily, a two part construction including a first and second assembly (23, 24). If the rays of light 35 received from the shutter 21 along the "C" axis 36 do not coincide with the "A" axis 37, then a third mirror 25 located within the second assembly 24 may be used to bend the rays of light along the the "A" axis 37. The first assembly 23 rotates about the "A" axis and is driven by a first servo-motor 26 through a first geared assembly 27. The first servo-motor 26 may be mounted to the second assembly 24. The rays of light received along the "A" axis by the first assembly 23 are bent along an orthogonal axis "B" 38 by a first mirror 28 attached to the first assembly 23. The light transmitted along the "B" axis is bent and redirected out of the light spot projector 20 by a second mirror 29. The second mirror 29 is attached to the first assembly 23, rotated about the "A" axis 37 with the first assembly 23, and also rotates independently about the "B" axis through a second geared assembly 30 driven by a second servo-motor 31. The second servo-motor 31 is also attached to the first assembly 23. The rotation positioning by the first and second servo-motors (26, 31) are controlled electronically by output signals 34B and 34C from the computer means 13, Referring to FIG. 3, the computer means receives input signals from the manned simulated aircraft cockpit as indicated by Block A. Once this information has been received, the coordinates and attitude of the simulated aircraft cockpit are calculated as indicated by Block B. The primary object's coordinates are received from the main program, these coordinates and the simulated aircraft coordinates are used to calculate the slant range between the simulated aircraft and the primary obJect as indicated by Block C. The result of this calculation is fed into Blocks D and F. In Block D the information is used to calculate the axal rotations necessary to rotate the light spot projector to track the primary object. As a result, output signals are transmitted to the first and second servo-motors for the appropriate degree of rotation as indicated by Block E. Simultaneously in Block F it is determined if the primary object is within the normal field of view. If it is, output signals are transmitted to the shutter to close, thereby blocking the transmission of light as indicated by Block G. If the primary object is not within the normal field of view, then the shutter's opening position is calculated and resulting output signals are transmitted to the shutter as indicated by Blocks H and J.

The programming of the computer means corresponding to the above steps, described generally in Blocks A through J, is within the capacity of those skilled in the art.

These descriptions and details have been shown for the purpose of illustrating this invention and that it will become apparent to those skilled in the art that various changes and/or modifications may be made without departing from the original spirit and scope of the invention.

It is claimed:

1. An enhanced limited field of view aircraft simulator for continuous visual tracking of a primary object of interest, a system comprising:
   a computer means programmed for receiving electronic input signals and producing electronic output signals:
   a manned simulated aircraft cockpit including controls coupled with and responsive to the computer means by receiving or generating electronic signals therefrom:
   a domed screen enclosing said cockpit;
   at least one visual projecting means coupled with and responsive to the computer means by receiving electronic signals therefrom, for projecting imagery onto the screen, producing a limited field of view:
   an enhanced projecting means coupled with and responsive to the computer means by receiving electronic signals therefrom, for projecting a light spot onto the screen outside of the limited field of view: and
   said primary object being reproduced in imagery form only when it tracks within the limited field of view portion of the screen and is reproduced as a light spot only when it tracks outside the limited field of view portion of the screen.

2. A system as set forth in claim 1 wherein said enhanced projecting means comprises:
   a light source for generating and transmitting rays of light;
   a light spot projector positioned for receiving the transmitted light, coupled with and responsive to the computer means by receiving electronic output signals therefrom, for projecting a light spot upon the screen, the position and movement of the spot varying as the output signals vary and corresponding to the relative position and movement of the primary object; and
   a shutter coupled with and responsive to the computer means by receiving electronic output signals therefrom, positioned in the path of the rays of light for varying the magnitude of the light spot.

3. A system as set forth in claim 2 wherein:
   the computer means computes the position and attitude of the manned simulated aircraft, the slant range between the the manned simulated aircraft and the primary object, the magnitude and direction of the axial rotation of the light spot projector, and the opening position of the shutter; and
   the shutter coupled with and responsive to electronic output signals from the computer means such that, upon receiving said output signals indicating that the primary object has migrated outside of the normal field of view, the shutter opens, transmitting the light to the light spot projector and upon receiving output signals indicating that the primary object's position is within the normal field of view the shutter closes, effectively blocking the transmission of light.

4. A system as set forth in claim 3 wherein the shutter is further coupled with and responsive to electronic output signals from the computer means such that it varies its opening proportional to the relative distance of the primary object to the manned aircraft cockpit, whereby as the distance decreases the shutter opening increases and as the relative distance increases the shutter opening decreases producing a corresponding change in the magnitude of the light spot.

5. A system as set forth in claim 4 wherein the light spot projector comprises:
   a first assembly capable of rotating about the "A" axis;
   a first mirror, disposed within the first assembly, receiving light along the "A" axis, and bending the light along the "B" axis:
   a second mirror, disposed within the first assembly, capable of rotating independently about the "B" axis, for bending said light received from said first mirror;

a first servo-motor for driving the first assembly about the "A" axis and a second servo-motor, mounted to the first assembly, for driving the second mirror about the "B" axis.

6. A system as set forth in claim 5 wherein the light spot projector further comprises:

a second assembly coupled with the first assembly about the "A" axis:

said first servo-motor mounted to the second assembly; and a third mirror, disposed within the second assembly, receiving light along the "C" axis and bending the light along the "A" axis.

7. A system as set for in claim 6 wherein the "A" axis and the "B" axis are orthogonal to one another.

8. A system as set forth in claim 7 wherein the light source is a laser light source.

* * * * *